July 23, 1968  M. J. SYVERSON  3,393,838
STORAGE CONTAINER AND DISPENSER
Filed July 11, 1966  2 Sheets-Sheet 1
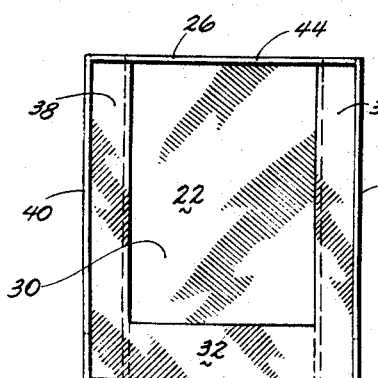
Fig. 5
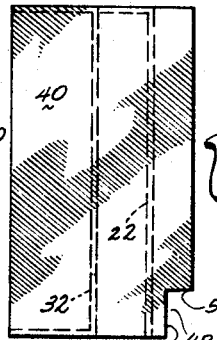
Fig. 6
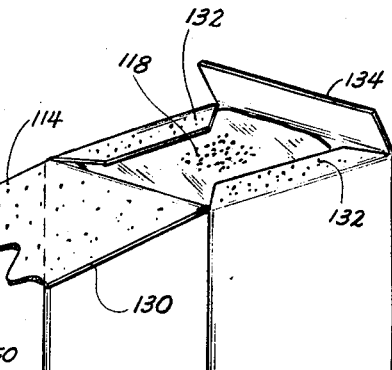
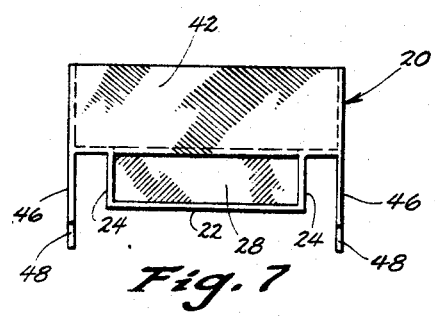
Fig. 7
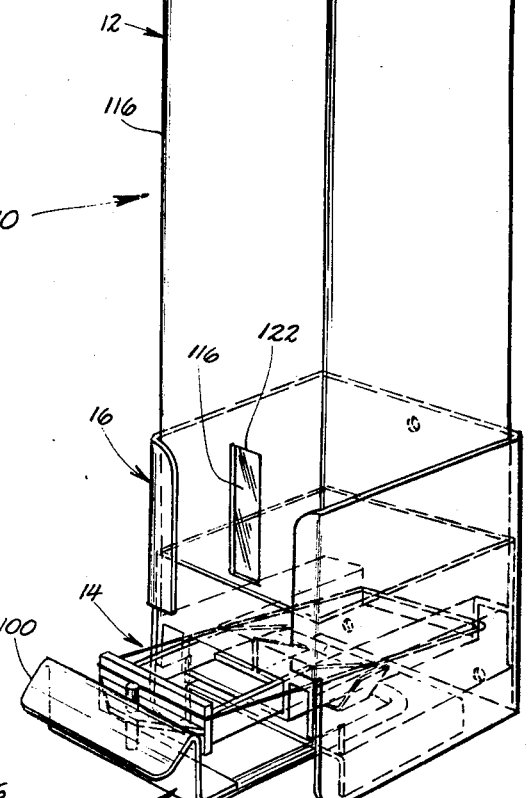
Fig. 1
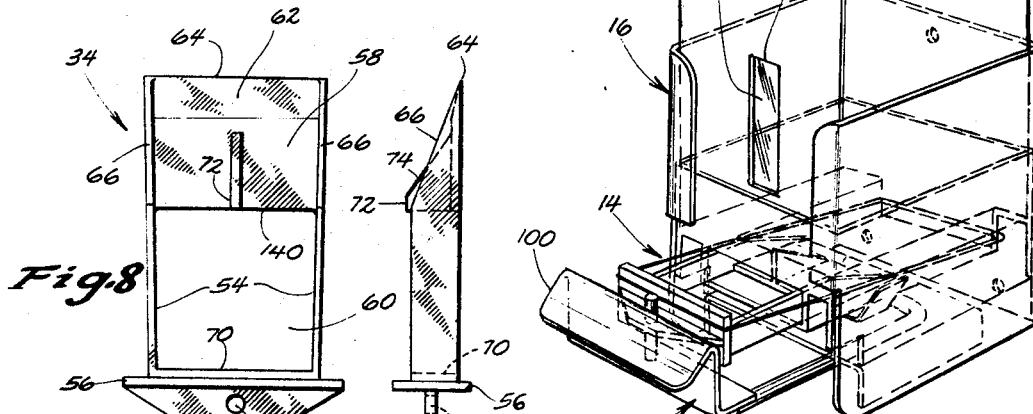
Fig. 8   Fig. 9
Fig. 10
INVENTOR.
MARTELLE J. SYVERSON
BY
Dick, Zarley, McKee & Thomte
ATTORNEYS July 23, 1968  M. J. SYVERSON  3,393,838
STORAGE CONTAINER AND DISPENSER
Filed July 11, 1966  2 Sheets-Sheet 2

INVENTOR.
MARTELLE J. SYVERSON
BY
Dick, Zarley, McKee & Thomte
ATTORNEYS

United States Patent Office 3,393,838
Patented July 23, 1968

3,393,838
STORAGE CONTAINER AND DISPENSER
Martelle J. Syverson, Albert Lea, Minn., assignor to Fountain Industries, Inc., Albert Lea, Minn., a corporation of Minnesota
Filed July 11, 1966, Ser. No. 564,180
26 Claims. (Cl. 222—181)

ABSTRACT OF THE DISCLOSURE

A device having a base unit comprising a compartment and a movable scoop positioned entirely within the compartment and having an opening in its bottom wall through which material in the base unit is dispensed when the scoop is moved to its extended open position. An elastic band may embrace the base unit and the forward wall of the scoop to yieldably hold the scoop in a closed condition. A ledge may extend across the access opening into the base unit compartment and over the scoop to control the amount of material being dispensed. A detachable handle unit may be connected by an upstanding pin to the forward end of the scoop, the handle unit having a cooperating stop means for limiting the movement of the scoop to an open position.

---

This invention relates to a storage container and dispenser and in particular to the packaging and dispensing or metering of any dry or dehydrated powder or granular products such as coffee, soap, talcum powder, dental powder, peanuts, candies, popcorn and sugar wherein a predetermined amount of product may be dispensed in a repetitious manner.

One of the principal objects of this invention is to provide a product container and a metering device each of which are so designed that when assembled they form a complete cartridge or product container which is self-sealing and will dispense a predetermined amount of a given product.

Another object of this invention is to provide a product container having one end sealed and the other end open and the container being so designed that it can be attached by glue or the like to the metering device thereby making the metering device a part of the container or cartridge combination.

Another related object of this invention is to provide a storage container and dispenser having a metering device comprised of two parts, the outer base unit into which the product container is inserted and a metering scoop which is inserted into an opening in the base unit.

A related object of this invention is to provide a metering device having a base unit capable of forming the bottom of the product container, supporting and retaining the scoop in its proper position, properly aligning the cartridge when used in conjunction with a cartridge mounting base or holder, guiding the scoop when being moved between open and closed positions, forming a sealing surface between itself and the product container, and serving as a holder for return spring devices which will return the scoop into a closed or sealed position when it is released from its open or extended position.

A further specific object of this invention is to provide a base unit having a flange on the inside front located above the scoop which serves to guide the scoop and also to stop the flow of product when the forward motion of the scoop is stopped; the width of the flange being in direct proportion to the opening in the base unit into which the scoop is inserted.

Some of the specific objects of this invention concerning the scoop include providing a scoop which is shorter in length than the inside of the base unit compartment so that the leading edge of the scoop does not contact the back wall of the base unit, providing a scoop having the front part of the bottom wall punched out leaving no restriction to keep the product from falling freely from the scoop when it is moved to its open or pulled out position, providing a scoop having an outside width at the leading edge which is wider than the outside width of the scoop side walls where they attach to the front of the scoop thus eliminating wedging of product when the scoop is being returned to its closed position inside the base unit. This invention also includes providing a scoop having a shoulder on the inside front face which matingly engages the inner edges of the base unit defining the opening in which the scoop is mounted thereby sealing the opening in the base unit and preventing leakage or spilling of the product when the scoop is in its closed position, providing a scoop having sidewalls which are tapered from a point immediately in back of where the bottom of the scoop is punched out to eliminate impaction of a product and to assist in keeping the flat bottom and front end of the scoop in close contact and in parallel position with the inside bottom of the base unit, providing a scoop having a leading edge which is tapered to allow for easy insertion of the scoop into the base unit and to keep it in a flat parallel relationship with the bottom of the base unit, providing a scoop having a front wall which is sufficiently larger than the opening in the base unit into which the scoop is inserted whereby when the scoop is in its closed position it tightly seals the opening into which it is inserted, and providing a scoop with a bottom wall portion having a flat leading surface supporting a vertically disposed stop element which has a forward taper extending to the scoop bottom wall portion and which will engage the top wall portion of the base unit located above the scoop and the opening in the base unit.

Yet another object of this invention is to provide a storage container and dispenser having a mounting base for the container and dispenser and including a finger actuating element detachably connected to a handle element on the scoop of the dispenser, and further including a stop means for selectively limiting the movement of the finger actuating member towards an open or extended position.

A further object of this invention is to provide a storage container and dispenser which is simple in design, economical to manufacture and refined in appearance.

These and other objects will be apparent to those skilled in the art.

This invention consists in the construction, arrangements, and combination of the various parts of the device, whereby the objects contemplated are attained as hereinafter more fully set forth, specifically pointed out in the claims, and illustrated in the accompanying drawings in which:

FIG. 1 is a fragmentary perspective view of the cartridge container and base unit dispenser mounted in a mounting base assembly adapted to be secured to a wall or the like;

FIG. 5 is a top plan view of the cartridge base unit;

FIG. 6 is a side elevation view of the cartridge base unit as viewed from the right side in FIG. 5;

FIG. 7 is a front elevational view of the cartridge base unit;

FIG. 8 is a top plan view of the metering scoop;

FIG. 9 is a side elevation view of the metering scoop of FIG. 8 as viewed from the right side; and FIG. 10 is a front elevational view of the metering scoop.

Figure 2:
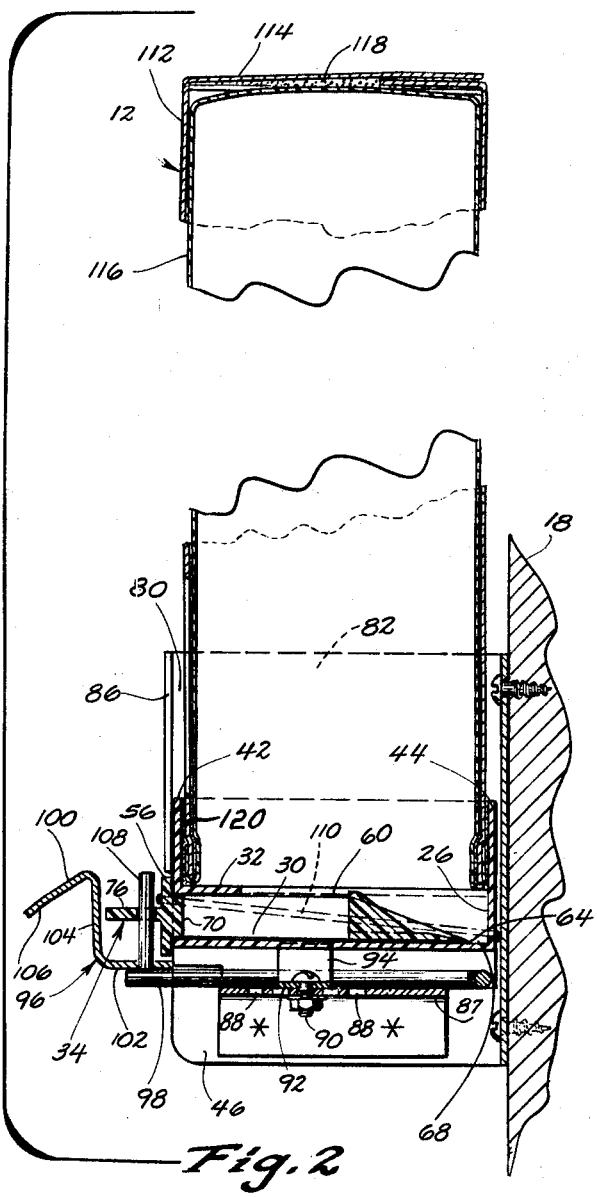
FIG. 2 is a fragmentary cross-sectional view of the structure in FIG. 1.

The cartridge and dispenser of this invention is referred to generally in FIG. 1 by the reference numeral 10 and includes a cartridge 12 mounted in a base unit dispenser 14 which in turn is positioned in a mounting base structure 16. As seen in FIG. 2, the mounting base 16 is secured to a wall 18.

The dispenser 14 includes as seen in FIGS. 5, 6 and 7, a base unit 20 having a bottom wall 22, parallel side walls 24, and an end wall 26. Opposite the end wall 26 is an opening 28 which communicates with a compartment 30 inside the base unit 20. A top wall portion 32 is provided over the forward part of the compartment 30 and serves to stop the flow of material through the opening 28 and also to guide the scoop 34 (FIGS. 8, 9 and 10). The area of the top portion 32 should be in direct proportion to the area of the opening 28 communicating with the compartment 30.

A pair of ledges 36 and 38 extend in a common horizontal plane with the top portion 32 and along the length of the side walls 24. An upstanding guide wall 40 extends along the outer longitudinal edges of the ledges 36 and 38 and cooperates with a front guide wall 42 and a back or rear guide wall 44 to embrace the cartridge container 12 as seen in FIGS. 1 and 2. Each of the side guide walls 40 include a depending skirt wall portion 46 which extend below the bottom wall 22. The forward edges of the depending flanges 46 each have a notch 48 formed therein to provide a pair of vertical and horizontal shoulders 50 and 52 respectively for engagement with a suitable support to hold the base unit in a desired position.

The scoop 34 of FIGS. 8, 9 and 10 is received in the opening 28 of the base unit 20. Scoop includes a pair of outwardly flaring side walls 54 extending from a front wall 56 having an area larger than the opening 28 to close the opening 28 when the scoop is in its closed position as shown in FIG. 2. A bottom wall portion 58 interconnects the opposite ends of the side walls 54 and is spaced a substantial distance from the front wall 56 to form an opening 60 through the bottom of the scoop unit 34. As seen in FIG. 8, the bottom wall portion 58 has a longitudinally tapered surface 62 extending to the forward edge of the bottom wall portion and terminating at the bottom surface of the bottom wall portion to provide a forward cutting edge 64. As seen in FIG. 9, the side walls 54 have forward portions 66 which are tapered and terminate at the cutting edge 64. The tapered surface 62 of the bottom wall portion 58 and the tapered edges 66 of the side walls 54 will facilitate moving the scoop 34 through material and eliminate any possible jamming of the scoop within the base unit 20. In FIG. 2 it is noted that the scoop unit 34 is in its closed position and there is a space 68 between the forward cutting edge 64 and the rear wall 26 which also serves to eliminate jamming of the forward end of the scoop 34 against this wall of the base unit.

Because the walls 66 of the scoop 34 flare outwardly from the front wall 56 the outside width of the cutting edge 64 is wider than the outside width of the scoop side walls where they attach to the front wall 56 and thus this eliminates any wedging of the material product when the scoop is being returned to a closed position as seen in FIG. 2.

A rectangular shaped shoulder 70 (FIGS. 2 and 8) is provided on the inner surface of the front wall 56 and is of such a size to matingly engage the inner peripheral edges of the opening 28 in the base unit 20 when the scoop is in its closed position. The front wall 56 of the scoop further serves to seal the opening 28 closed.

When the metering device is being used without the mounting base 16 a stop means on the scoop 34 is employed to limit the amount of travel of the scoop to an open position. Thus, an upstanding stop element 72 is provided on the bottom wall portion 58 and may be cut to any desired length for appropriate engagement with the top wall portion 32 of the base unit 20. The shorter the stop element 72, the farther the scoop 34 may be opened. The product being dispensed will to a large extent determine the positioning of the stop element 72. This stop element may be cut as desired after manufacture to give the desired length. Similar to the tapered surface 62 and the side wall edges 66, the stop element has a tapered front surface 74 which terminates at the top surface of the bottom wall portion 58 as seen in FIG. 9 for example.

A handle portion 76 extends outwardly from the front wall 56 and is provided with a vertical opening 78.

Figure 4:
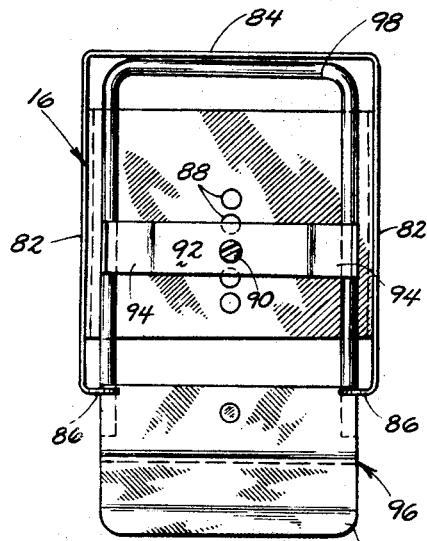
FIG. 4 is a top plan view of the mounting base unit of FIG. 3.
Figure 3:
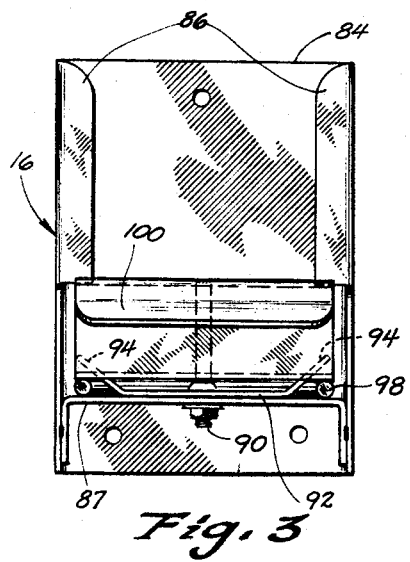
FIG. 3 is a front elevation view of the mounting base unit only.

In FIGS. 3 and 4, the mounting base 16 is shown in detail to have a chamber 80 defined by a pair of side walls 82 interconnected by an end wall 84. A pair of inwardly extending front flanges 86 are provided opposite the end wall 84. A bottom wall 87 is provided secured to the side walls 82 and has a series of longitudinally aligned holes 88 in which a stop fastener bolt 90 is received to hold a transversely extending stop element 92 to the bottom wall 87. The outer free ends 94 of the stop element 92 are bent to extend upwardly towards the adjacent side walls 82.

A handle unit 96 is provided in the mounting base unit 16 and includes a U-shaped frame member 98 positioned to move on top of the bottom wall 87 until the base end of the U-shaped member 98 engages the stop element 92. A finger engaging plate element 100 is provided to interconnect the free ends of the U-shaped frame element 98 and includes a first horizontally extending plate portion 102 interconnected to an upstanding plate portion 104 which in turn is connected to an outwardly and downwardly extending finger engaging portion 106 as best seen in FIG. 2. An upstanding pin 108 is secured to the portion 102 and is adapted to extend through the hole 78 in the scoop handle portion 76.

As best seen in FIG. 2, an elastic band 110 extends around the front wall 56 of the scoop 34 above the scoop handle 76 and thence along the side walls 24 of the base unit 20 and around the front wall 26 adjacent the bottom wall 22. It is thus seen that the action of the elastic element 110 serves to return the scoop to its closed position of FIG. 2 and also to maintain the bottom wall 58 and its forward cutting edge 64 in mating engagement with the bottom wall 22 of the base unit 20 as the scoop moves between open and closed positions. When the dispenser device is used with the mounting base 16, the stop element 92 is preferably used and may be positioned at any one of the holes 88 to permit the scoop to open the desired amount.

The cartridge 12 has an outer housing 112 open at its bottom end as seen in FIGS. 1 and 2 and closed at its top end 114. The lower edges of the housing 112 are positioned in the compartment 30 and bear against the ledges 36 and 38 as well as the top wall portion 32 of the base unit 20. An inner liner 116 of transparent plastic material or the like is provided in the housing 112 and is secured by adhesive 118 to the top wall 114 of the housing 112 and has its opposite lower open end folded backwardly along the outside edges of the cartridge housing 12 where adhesive 120 may be employed to secure the base unit 20, the end edges of the inner liner 116 and the bottom end of the cartridge housing 112 as a unit. It is seen that the contents of the cartridge 12 are perfectly sealed against contamination of all forms and when the cartridge 12 is empty it is simply lifted out of the mounting base 16 and is replaced with a new cartridge 12 and its dispenser including the base unit 20 with the scoop 34.

A viewing window 122 is formed in the carriage housing 112 adjacent its lower open end as seen in FIGS. 1 and 2 so that the amount of material left in the cartridge is readily ascertained by visual inspection through the transparent material 116 of the plastic inner liner.

The closed top end 114 of the cartridge 112 is formed by a large end element 130 which is folded over a pair of flap elements 132 and an opposite end flap element 134 where they all are secured by adhesive to close the end of the cartridge 112.

It is thus seen that the metering device of this invention with the cartridge 12 may be operated with or without the mounting base 16 and in either event the product material within the inner liner 116 will flow by gravity into the compartment 30 through the outlet opening 60 in the scoop unit 34. As the scoop unit 34 is pulled outwardly the trailing edge 140 of the bottom wall portion 58 will move a certain amount of the product out of the compartment 30 through the front wall opening 28. The top wall portion 32 of the base unit 20 will limit the continuous flow of material out of the opening 28. It is noted that as the scoop member 34 is being moved to its open position, the size of the opening into the compartment 22 of the base unit 20 is reduced since the bottom wall portion 58 of the scoop member 34 tends to move towards the top wall portion 32 as viewed in FIG. 2 and thus when the scoop member is returned to its closed position, the material that has fallen into the compartment 30 is moved by the bottom wall portion 58 of the scoop to the right as viewed in FIG. 2. By the time the scoop member has moved to its completely closed position, the shoulder 70 has matingly sealed off the opening 28 as well as the front wall 56 having engaged the front edges of the opening 28 to further seal the opening. Thus by this construction and operation, an accurate predetermined quantity of material may be dispensed during each operation of the metering device.

Some changes may be made in the construction and arrangement of my storage container and dispenser without departing from the real spirit and purpose of my invention, and it is my intention to cover by my claims, any modified forms of structurer or use of mechanical equivalents which may be reasonably included within their scope.

I claim:
1. A material dispenser, comprising,
a base unit having a bottom wall, a pair of side walls and front and rear end walls, and the front wall having an opening formed therein, said bottom, side and end walls cooperating to define a compartment,
a movable scoop positioned in said compartment to move through said opening in moving between open and closed positions, said scoop having one end wall for closing said opening when said scoop is in said closed position,
said scoop including a pair of sidewalls interconnected at one end by said one end wall and at the opposite end by a bottom wall portion, said one end wall, side walls and bottom wall cooperating to define an outlet opening in said scoop,
a stop means limiting travel of said scoop to an open position to a predetermined distance, and
a handle portion in the outer surface of said one wall of said scoop, and a mounting base is provided having a chamber in which said base unit is positioned, a movable handle unit in said mounting base having means for detachable engagement with said scoop handle portion, and a finger engaging portion on the front end of said handle unit.

2. The structure of claim 1 wherein said scoop is substantially completely disposed within said compartment when in a closed position and a container is in direct communication with said compartment and said scoop.

3. A material dispenser, comprising,
a base unit having a bottom wall, a pair of side walls and front and rear end walls, and the front wall having an opening formed therein, said bottom, side and end walls cooperating to define a compartment,
a movable scoop positioned in said compartment to move through said opening in moving between open and closed positions, said scoop having one end wall for closing said opening when said scoop is in said closed position,
said scoop including a pair of side walls interconnected at one end by said one end wall and at the opposite end by a bottom wall portion, said one end wall, side walls and bottom wall cooperating to define an outlet in said scoop,
a stop means to limit travel of said scoop to an open position to a predetermined distance,
said bottom wall portion having a longitudinally tapered top surface extending to the forward edge of said bottom wall portion and terminating at the bottom surface of said bottom wall portion to provide a forward cutting edge,
said pair of side walls of said scoop have forward portions tapered forwardly and terminating at the bottom surface of said bottom wall portion, and
said pair of scoop side walls flare outwardly along their length from said one end wall.

4. A particulate material dispenser unit, comprising,
a material container having a base unit,
said base unit having a bottom wall, a pair of side walls and front and rear end walls, and the front wall having an outlet opening formed therein, said bottom wall being substantially completely exposed to the interior of said container,
a movable agitator scoop positioned in said outlet opening on said bottom wall to move through said opening in moving between open and closed positions, said scoop having one end wall for closing said outlet opening when said scoop is in said closed position,
said scoop including a pair of side walls interconnected at one end by said one end wall and at the opposite end by an agitation means, said one end wall, side walls and agitation means cooperating to define a flow through opening through said scoop,
said agitation means when said scoop is in said closed position being spaced remotely from said one wall and terminating close to said rear wall of said base unit to maximize the size of the flow through opening through said scoop,
said base unit having a horizontally disposed control wall portion extending from said front wall and between said pair of side walls and towards said rear wall end wall in a plane above said outlet opening through said front wall to limit flow of particulate material from said container through said outlet opening to substantially only times when said scoop is being moved and said material is being guided towards said front wall and out said outlet opening,
said scoop including said agitation means when in said closed position being entirely disposed on said bottom wall and being entirely directly exposed to said particulate material in said container, and
said agitation means having a thickness which is substantially less than the height of said outlet opening.

5. The structure of claim 4 wherein said agitation means includes a bottom wall portion having a longitudinally tapered top surface portion extending away from said one wall to the rear edge of said bottom wall portion and terminating at the bottom surface of said bottom wall portion to provide a cutting edge.

6. The structure of claim 5 wherein said pair of side walls of said scoop have rear portions tapered away from said one wall terminating at and in the plane of the cutting edge of said bottom wall portion to form a cutting edge along the outer end of said scoop.

7. The structure of claim 6 wherein said cutting edge of said scoop is spaced from the adjacent rear end wall of said base unit when said scoop is in said closed position.

8. The structure of claim 7 wherein a top wall portion extends between said pair of side walls of said base unit and said top wall portion is positioned closely adjacent the top longitudinal edges of said scoop side walls and extends towards said rear end wall from said front wall in a plane above said opening.

9. The structure of claim 6 wherein an upstanding stop element is provided on said bottom wall portion of said scoop, said stop element having sufficient height to engage said control wall portion upon said scoop being moved a predetermined distance towards said open position.

10. The structure of claim 9 wherein the edge of said stop element facing away from said one wall is tapered to the top surface of said bottom wall portion of said scoop.

11. The structure of claim 5 wherein said bottom wall portion has a bottom surface parallel to and in sliding engagement with the adjacent top surface of the bottom wall of said base unit.

12. The structure of claim 11 wherein said pair of scoop side walls are closely positioned to said base unit side walls and flare outwardly along their length from said one end wall whereby said scoop may be moved to said closed position through said material with a minimum of resistance from said material.

13. The structure of claim 4 and a pair of ledge wall portions extend outside and along the top longitudinal edges of said pair of base unit side walls, the top surfaces of said ledge wall portions and said control wall portion being in the same plane.

14. The structure of claim 13 and a pair of guide walls extend upwardly from the outer longitudinal edges of said pair of ledges and are interconnected by upstanding forward and rear end guide walls.

15. The structure of claim 14 and said material container being further defined as a cartridge, said cartridge having one open end positioned in mating engagement with said guide walls and with the outer edge of said cartridge open end being in mating engagement with said control wall portion and said pair of base unit ledges.

16. The structure of claim 15 and said cartridge includes a collapsible inner liner having one open end, the sides of said open end of said inner liner extending out of the open end of said cartridge over the open end edges and back along the length of said cartridge for holding engagement between said upstanding guide walls of said cartridge.

17. The structure of claim 16 and said inner liner is secured to the inside of the cartridge in a small localized area whereby said liner may collapse as material is emptied therefrom.

18. The structure of claim 17 wherein said inner liner is formed of transparent material and a window opening is provided in said cartridge closely adjacent its open end.

19. The structure of claim 4 wherein an elastic means is connected to said scoop to normally maintain said scoop in said closed position and return said scoop to said closed position upon said scoop being moved to said open position.

20. The structure of claim 19 wherein said elastic means embraces the exterior of said base unit and said one end wall of said scoop for yieldably holding said scoop in said closed position.

21. The structure of claim 4 and a shoulder is provided on the inner surface of said one end wall, said shoulder being of such a size to matingly engage around its periphery the inner peripheral edges of said outlet opening in said base unit front wall when said scoop is in said closed position.

22. The structure of claim 4 and a handle portion is provided on the outer surface of said one wall of said scoop, and a mounting base is provided having support means on which said base unit is positioned, and a movable handle unit in said mounting base having means for detachable engagement with said scoop handle portion.

23. The structure of claim 22 and said scoop handle portion has a vertical opening to receive an upstanding pin secured to said handle unit.

24. The structure of claim 22 wherein said handle unit includes a U-shaped frame extending along said support means when said handle unit is in a closed position, a stop element secured to said support means for engagement with the base portion of said U-shaped frame upon said handle unit being moved a predetermined distance towards an open position.

25. The structure of claim 24 wherein said stop element has outer end portions positioned over the side portions of said U-shaped frame to limit vertical movement of said handle unit.

26. The structure of claim 25 wherein lock means is provided for selectively positioning said stop element along the length of said base unit support means.

References Cited

UNITED STATES PATENTS

| | | | |
|---|---|---|---|
| 609,017 | 8/1898 | Foss | 221—264 X |
| 2,554,570 | 5/1951 | Harvey | 222—386.5 X |
| 471,670 | 3/1892 | Jones et al. | 222—361 |
| 2,109,795 | 3/1938 | Hall | 222—366 |
| 2,162,286 | 6/1939 | Siefert | 222—361 |
| 2,176,562 | 9/1939 | Rose | 222—361 |
| 2,500,059 | 3/1950 | Burnham | 222—361 |
| 2,603,386 | 7/1952 | Barnes | 222—361 |
| 3,276,637 | 9/1966 | Fender | 222—361 |

FOREIGN PATENTS

| | | |
|---|---|---|
| 135,617 | 5/1952 | Sweden. |

SAMUEL F. COLEMAN, *Primary Examiner.*